Figure 6:
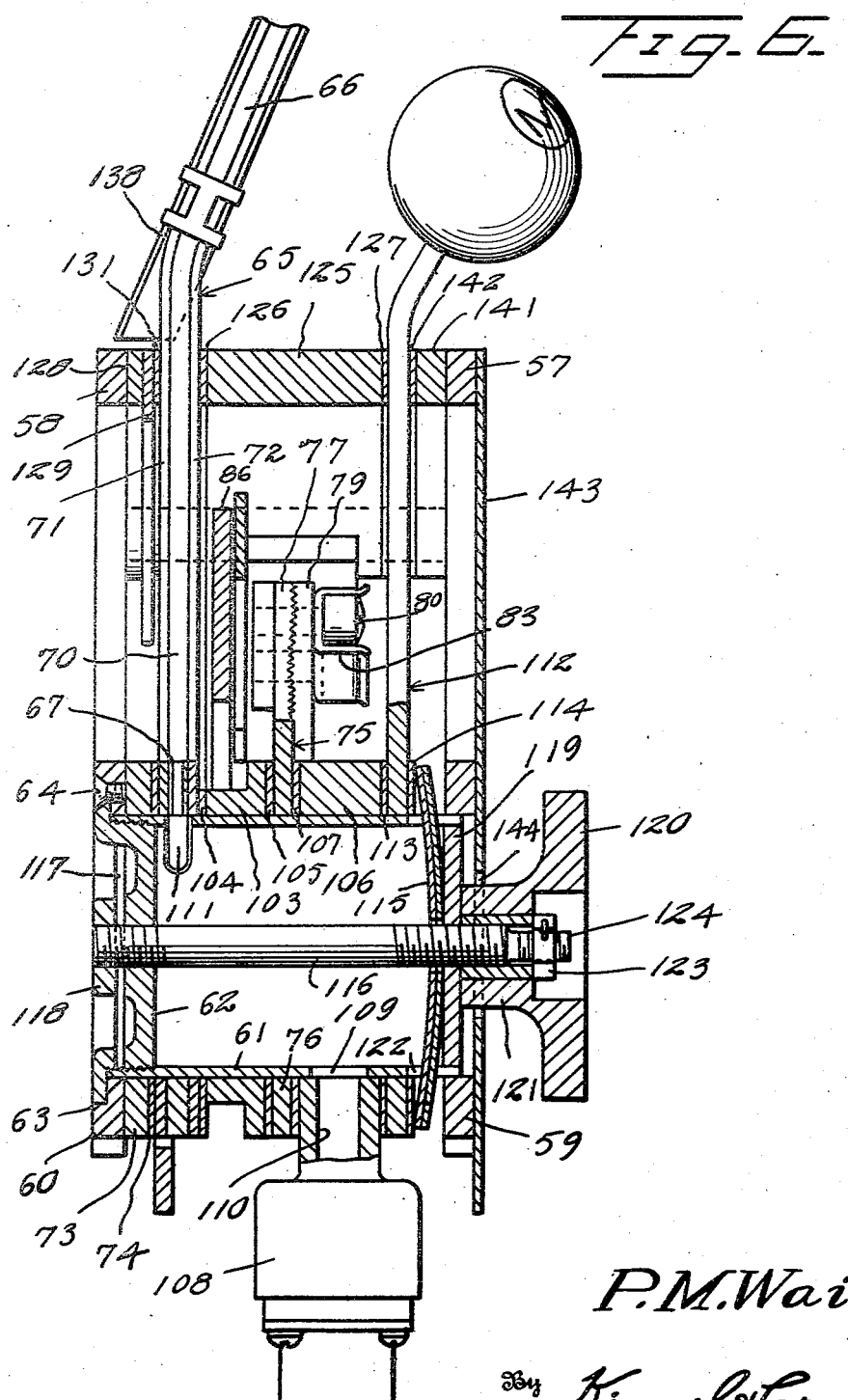

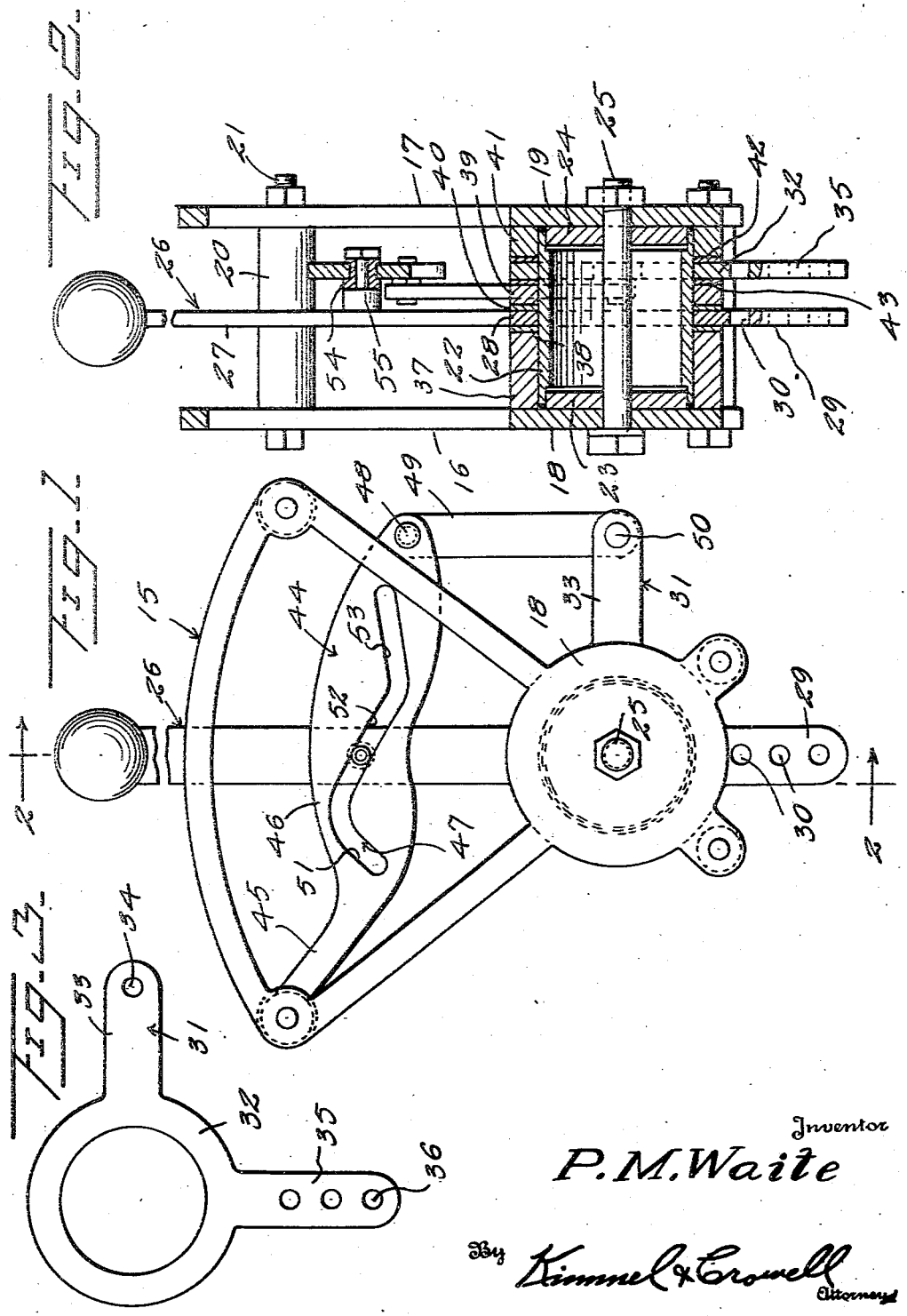

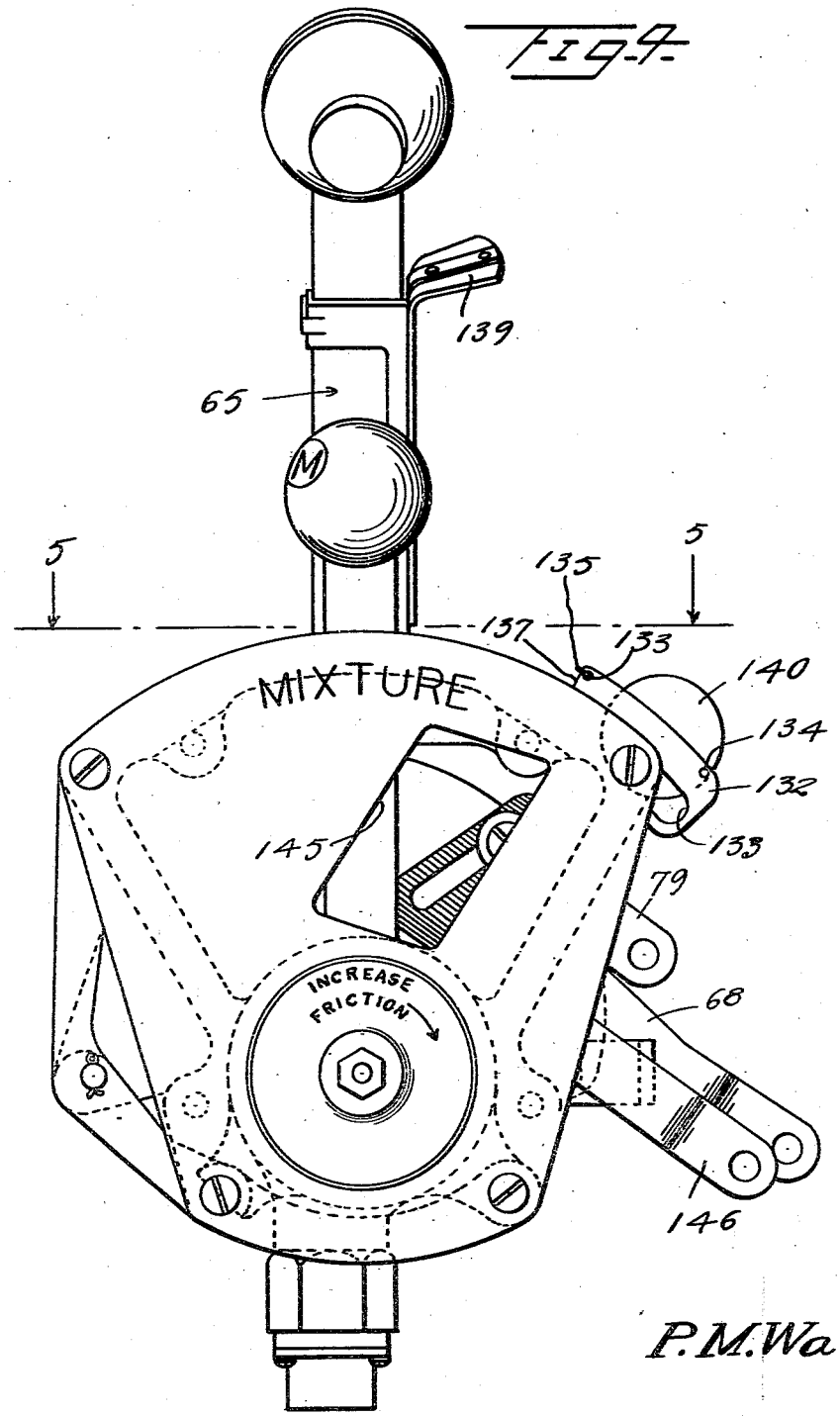

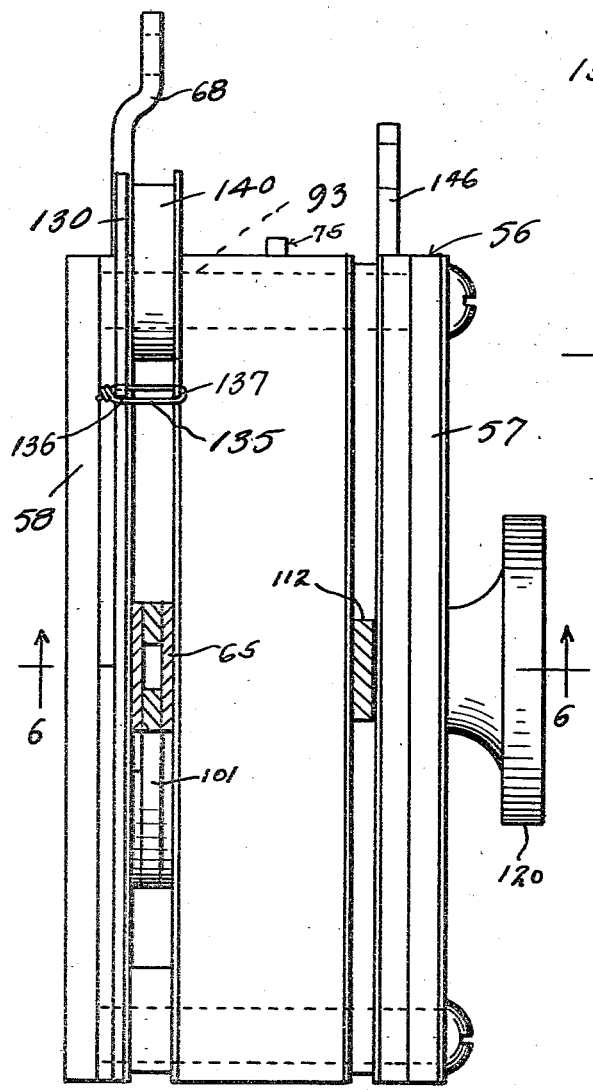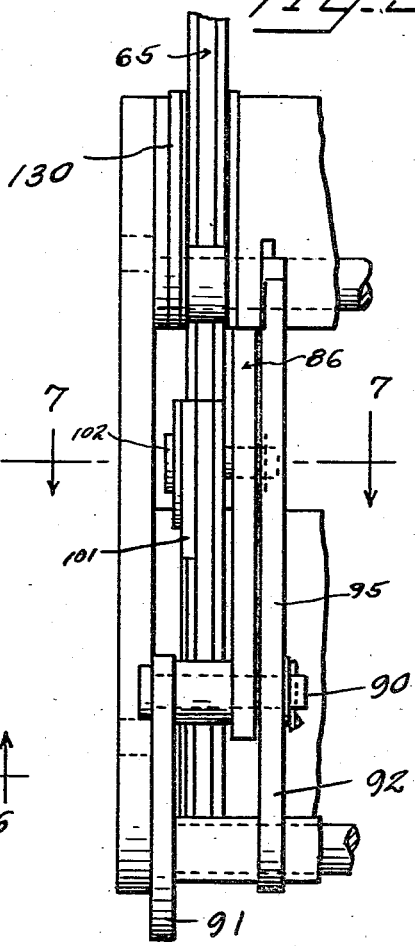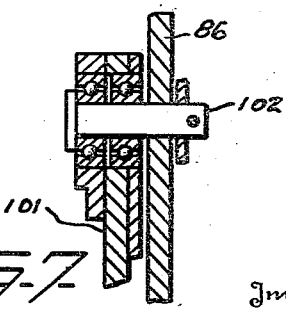

Oct. 15, 1946.    P. M. WAITE    2,409,231
THROTTLE CONTROL
Filed Sept. 28, 1943    6 Sheets-Sheet 4

Inventor
P. M. Waite
By Kimmel & Crowell
Attorneys

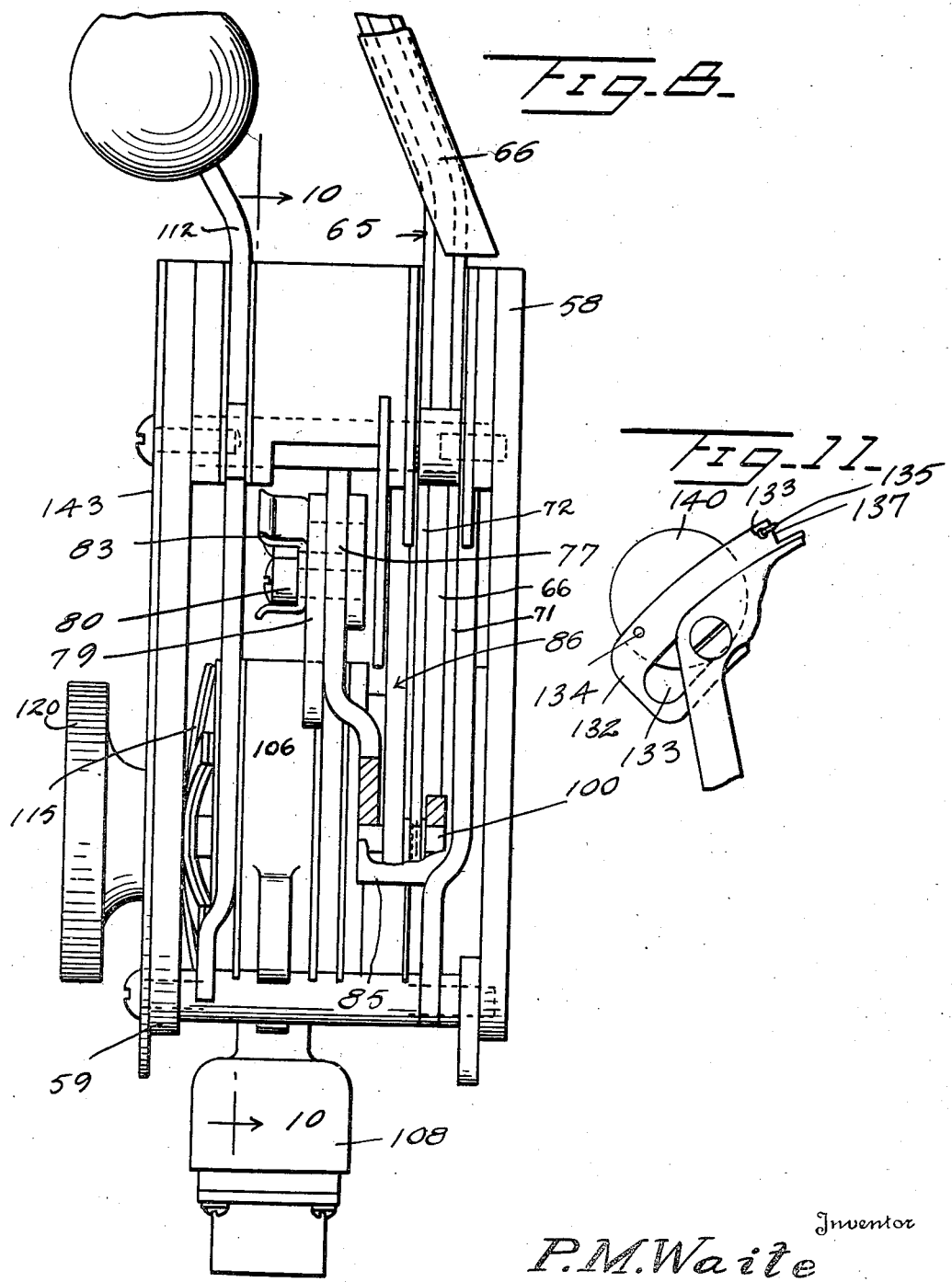

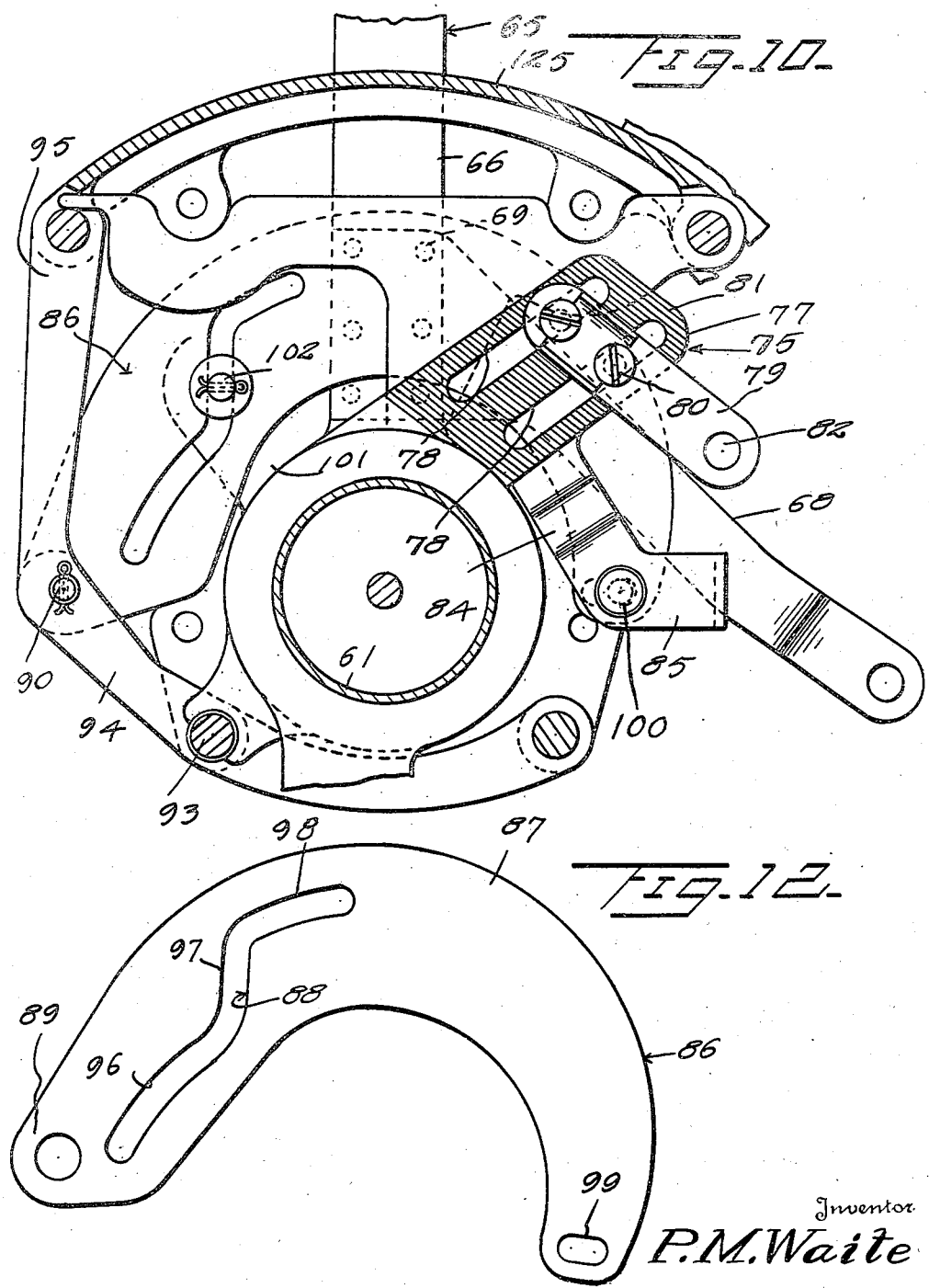

Patented Oct. 15, 1946

2,409,231

UNITED STATES PATENT OFFICE 2,409,231

THROTTLE CONTROL

Philip M. Waite, Corry, Pa.

Application September 28, 1943, Serial No. 504,184

10 Claims. (Cl. 74—471)

This invention relates to throttle controls for airplane engines and is an improvement over the construction shown in my copending application Serial Number 424,080, filed December 22, 1941, for throttle controls, and is a coninuation in part and an improvement over the construction embodied in my copending application Serial Number 467,882, filed December 4, 1942 for Throttle controls.

In the regulation of the speed of an aircraft, it is very desirable that the pilot of the plane be relieved as much as possible of adjusting either simultaneously or in sequence the positions of the various engine and propeller regulating levers. Heretofore, individual regulating levers have been provided for regulating the position of the main throttle, the operation of the supercharger, and the operation of the propeller pitch changing mechanism. The prior structure, which is known as a quadrant, required that the pilot manually shift each control or regulating lever in synchronism with the various instruments on the instrument panel, and during combat operations the pilot frequently is unable to adjust the several levers in their proper sequence, thereby resulting in improper engine and plane operation.

It is, therefore, an object of this invention to provide a throttle control which will eliminate the personal element in engine and plane operation, and which will automatically and mechanically synchronize the operation of various regulating levers with adjustment by the pilot of the main throttle lever. With a construction of this kind, the pilot will be able to keep one hand on the throttle lever and the other hand on the "stick," and it will not be necessary for the pilot to divert his attention from an enemy plane to his instrument panel.

Another object of this invention is to provide a throttle embodying a swinging cam member which is positively rocked by swinging of the main throttle lever, and it will be understood that there may be one or more of these cam members and secondary levers for regulating the desired part or parts in properly timed sequence with the adjustment of the main throttle lever.

To the above objects and others which may hereinafter appear the invention consists of the novel construction, combination and arrangement of parts as will be more specifically referred to and illustrated in the accompanying drawings, wherein are shown embodiments of this invention, but it is to be understood that changes, variations and modifications may be resorted to which fall within the scope of the invention as claimed.

In the drawings:

Figure 1 is a detail side elevation of a throttle control constructed according to an embodiment of this invention, Figure 2 is a sectional view taken on the line 2—2 of Figure 1, Figure 3 is a detail side elevation of the auxiliary or secondary lever operated in synchronism with the main lever, Figure 4 is a detail front elevation of a modified form of this invention, Figure 5 is a sectional view taken on the line 5—5 of Figure 4, Figure 6 is a sectional view taken on the line 6—6 of Figure 5, Figure 7 is a fragmentary sectional view taken on the line 7—7 of Figure 9, Figure 8 is a detail side elevation partly broken away and in section of the device, Figure 9 is a fragmentary side elevation on the side opposite from that shown in Figure 8, Figure 10 is a sectional view taken on the line 10—10 of Figure 8, Figure 11 is a fragmentary front elevation of the adjustable stop for the main lever, and Figure 12 is a detail side elevation of the swinging cam element.

Referring to the drawings, and first to Figures 1 to 3, there is disclosed a throttle control or quadrant which includes a frame structure generally designated as 15. The frame structure 15 includes a front sector-shaped frame member 16 and a rear sector-shaped frame member 17. The two frame members 16 and 17 at their lower portions are formed with a disc-shaped hub 18 and 19, respectively, and the frame members 16 and 17 are held in spaced apart relation at their upper portions by spacing members 20 which are secured to the frame members 16 and 17 by holding bolts or fastening members 21.

The lower portion of the quadrant or throttle control is formed with a stationary hub or pivot member 22 which is of cylindrical construction and is disposed between the plates or disc-shaped members 18 and 19. The hub or stationary pivot 22 has mounted in the opposite ends thereof disc-shaped plates 23 and 24 and a securing bolt 25 is extended through the plates or disc members 18 and 19 and also through the disc members 23 and 24.

A main throttle lever 26 which is adapted to be connected to the throttle of an internal combustion engine is pivotally mounted on the pivot member 22. The throttle member 26 includes an elongated lever arm 27 which at its lower portion is formed with a ring-shaped hub 28 rotatably engaging about the stationary cylindrical pivot member 22. A lower lever arm 29 extends from the hub 28 and is formed with a plurality of openings 30 through which fastening members may be extended to adjust the leverage of the linkage connected to the lever arm 29.

A second lever generally designated as 31 is rockably mounted on the hub or pivot member 22 and includes a ring-shaped hub part 32 rotatably engaging the pivot member 22, a lever arm 33 formed with an opening 34 at its outer portion, and a right angularly disposed lever arm 35. The arm 35 extends below the frame structure and is formed with openings 36 for receiving securing means to connect the arm 35 with the desired part which is to be adjusted in synchronism with the adjustment of the throttle member 26. As an example the arm 35 may be connected either to the propeller adjusting mechanism or to a supercharger. It will, of course, be understood that there may be one or more auxiliary or secondary levers mounted on the pivot member 22 and adjusted in synchronism with the adjustment of the main throttle lever 26.

The pivot member 26 has mounted thereabout a cylindrical spacer 37 disposed at one side of the main throttle lever 26, and a friction ring 38 is interposed between the adjacent end of the spacer 37 and the side of the hub 28 of the throttle lever 26. A second spacer ring 39 is mounted on the pivot member 22 on the opposite side of the hub 28 and a friction ring 40 is interposed between the confronting faces of the ring 39 and the hub 28. A ring-shaped spacer 41 is mounted on the pivot member 22 between the frame member 17 and the hub 32 of the lever 31. A friction ring 42 is interposed between the confronting end of the spacer 41 and the adjacent side of the hub 32. A friction ring 43 is also interposed between the confronting sides of the spacer 39 and the hub 32.

The lever 31 is adapted to be rocked in synchronism with the rocking or swinging of the main lever 26 and at a differential movement by means of a pivoted cam plate 44. The cam plate 44 is provided with an arm 45 connected to one end of the body 46 of the cam and the arm 45 is adapted to be rockably mounted on one of the bolts 21 which hold the frame structure together. The body 46 of the cam is formed with an irregularly shaped cam track 47 which has such a configuration extending lengthwise of the cam body 46 as to provide a differential rocking movement of the secondary or auxiliary lever 31. The end of the body 46 opposite from the arm 45 has pivotally secured thereto as at 48 one end of a link 49. The opposite end of the link 49 is pivotally secured as at 50 to the outer end of the arm 33 of the lever 31. As at present shown, the cam track 47 is provided with a relatively sharp upwardly extending track portion 51 which communicates with a downwardly inclined straight track portion 52, and the latter communicates with an obtusely related cam track portion 53. The first cam track portion 51 is provided in order to effect a rapid downward rocking of the lever 31, and the cam track portion 52 which is the intermediate cam track portion is adapted to provide an intermediate dwell or inactive cam track portion wherein the lever 31 will be held stationary while the main throttle 26 is being rocked forwardly or to the right, as viewed in Figure 1. The obtusely related and upwardly inclined cam track portion 53 provides for the final downward rocking of the lever 31 at the end of the movement of lever 26 to the right.

The main throttle 26 has mounted thereon a roller 54 which engages in the cam track 47, the roller 54 being rotatably carried by a roller support 55 which is fixed to the main throttle 26.

Referring now to Figures 4 to 12, inclusive, there is disclosed a modified form and production model of a throttle control or quadrant. The throttle shown in Figures 4 to 12 includes a frame structure generally designated as 56 which is somewhat similar to the frame structure 15. The frame structure 56 includes front and rear frame members 57 and 58 of sector-shape having formed at their lower portions ring-shaped pivot supporting members 59 and 60, respectively. A stationary cylindrical pivot member 61 is mounted at the opposite ends thereof in the annular frame members 59 and 60. Preferably, an end plate 62 is threaded into one end of the stationary pivot 61 and is seated at its outer end in a rabbet 63 formed in the annular frame member 60 and is secured therein by fastening members 64.

A main throttle lever, generally designated as 65, is rockably mounted on the pivot member 61, being formed with an elongated lever arm 66 having a ring-shaped hub 67 rotatably engaging the pivot member 61. An angularly disposed and sidewise projecting arm 68 is fixed to the lever arm 66, being shown more clearly in Figure 10. The arm 68 in the present instance, is riveted or otherwise fixed, as at 69 to the arm 66. In the present instance, the main throttle member 65 is formed of an inner arm 70 and outer arms or plies 71 and 72.

A spacer ring 73 is mounted on the pivot member 61 at the rear side of the lever 65 and a friction ring 74 is interposed between the confronting end of the spacer 73 and the adjacent end or side of the hub 67. A secondary or auxiliary lever, generally designated as 75, is rockably mounted on the pivot member 61 forwardly of the lever 65. The secondary lever 75 is adapted to be connected to a suitable part which is operated in synchronism with the main lever 65 and as an example may be connected to either the supercharger or to the propeller pitch adjusting mechanism.

The lever 75 includes an annular hub 76 which is rotatably mounted on the stationary pivot 61. An angularly disposed relatively wide arm 77 is formed integral with the hub 76 and is formed with a pair of elongated lengthwise extending slots 78. An adjustable arm 79 is secured by fastening members 80 to the arm 77, and preferably, one side of the arm 77 is formed with a series of serrations or teeth 81 and the arm 79 is formed with complementary serrations so that the arm 79 which is disposed at an obtuse angle to the arm 77 may be adjusted toward or from the pivotal center of the lever 75. The arm 79 extends in the same direction as the arm 68 of the main lever 66 and is formed adjacent the outer end thereof with an opening 82 for receiving securing means to secure one end of a linkage to the arm 79. A U-shaped guard or shield 83 is mounted on the lever arm 79 and has the parallel sides thereof engaging on the opposite sides of the fastening members 80.

A second lever 84 is formed integral with the arm 77 and extends outwardly at a substantially acute angle with respect to the length of the arm 79. The outer end portion of the lever arm 84 is formed with an obtusely disposed U-shaped arm portion 85. A rockable cam element, generally designated as 86, is mounted in the frame structure 56 and comprises an elongated longitudinally curved plate 87 which is formed with a cam track 88. One end 89 of the plate 87 is pivotally mounted on a pivot member 90 which is supported within the frame 56 by a pair of supporting members 91 and 92.

The supporting member 91 is the rearmost cam supporting member and is secured to and extends laterally of the lowermost frame securing bolts 93. The supporting member 92 is of substantially L-shape as shown in Figure 10 and includes a lower arm 94 secured to the two lowermost fastening members 93 and also includes an upwardly extending arm 95 which is secured to the upper fastening members 93. The cam track 88 includes an arcuate track portion 96 disposed on substantially the arc having as its radius the center of the pivot member 61 so that during the initial rocking of the main lever 65, the cam plate 87 will not be rocked therewith. The cam track 88 includes an upwardly extending track portion 97 communicating with the track portion 96 which is disposed on such an angle as to effect a rapid downward swinging of the secondary lever 75.

The upper end of the track portion 97 communicates with a second arcuate track portion 98 which may be disposed on an arc having as a center the center of the pivot member 61 so that during the last rocking movement of the main lever 65 the cam plate 87 will not be rocked therewith. The plate 87 at the end thereof opposite from the pivot 90 is formed with an elongated slot 99 in which a sliding pivot member 100 is adapted to slidingly engage. The pivot 100 is secured between the opposite parallel sides of the U-shaped arm portion 85 as shown more clearly in Figure 8 so that rocking of the cam will effect rocking of the secondary lever 75 through the lever arm 84 and the extension 85.

The main lever 65 is provided on one edge thereof with an extension 101 in which a pivot member or pin 102 is secured. The pivot member 102 may be in the form of a roller or the like which is adapted to engage in the cam track 88 so that the came 86 will be rocked in a differential movement with rocking of the main lever 65.

A spacer ring 103 is mounted on the cylindrical pivot 61 between the levers 65 and 75 and a friction ring 104 is interposed between the rear side of the spacer 103 and the forward side of the hub 67. A friction washer 105 is interposed between the forward side of the spacer ring 103 and the rear side of the hub 76 of the secondary lever 75. A spacer ring 106 is mounted on the pivot member 61 forwardly of the lever 75 and a friction washer 107 is interposed between the rear side of the spacer 106 and the forward side of the lever 75.

In the present instance, the spacer 106 has secured thereto an electrical coupling unit 108 for connecting a switch carried by the outer upper end of the lever 65 with the desired portion of the airplane. The hub or pivot member 61 is formed with an opening 109 through which the wires may extend and the spacer 106 is also formed with an opening 110 communicating the coupling 108 with the interior of the pivot member 61. The pivot member 61 is also formed with an elongated arcuate opening 111 beneath the lever 65 so that the wires from the coupling member 108 may be extended through the opening 111 to the upper end of the lever 65.

A third manually operable lever 112 is rockably mounted on the pivot member 61 forwardly of the spacer 106. The lever 112 may be used for regulating the mixture of the fuel passing through the carburetor of the engine and the lever 112 is independent in its movement with respect to the main and secondary levers.

A friction washer 113 is interposed between the hub of the lever 112 and the forward side of the spacer 106, and a second friction washer 114 engages on the forward side of the hub of the lever 112. The several levers which are mounted on the pivot member 61 are adapted to be regulated as to their free rocking movement by means of a resilient spider 115. The spider 115 bears against the friction ring 114 and is mounted on a centrally disposed bolt 116 which is secured at one end to the plate 62.

A securing pin 117 extends through the bolt 116 and a boss 118 is formed on the plate 62 so as to lock the bolt 116 against rotation. A disc-shaped plate 119 is slidingly mounted on the interior of the pivot member 61 and a hand wheel 120 which is provided with a boss 121 is threadably mounted on the forward end of the bolt 116. The rear end of the boss 121 bears against the sliding plate 119 which bears against the spring spider 115 so that adjustment of the hand wheel or nut 120 will place the desired tension on the spider 115, and the latter will place the desired frictional tension on the several levers which are mounted on the pivot member 61.

The arms of the spider 115 loosely extend through lengthwise extending slots 122 which are formed in the forward end of the cylindrical pivot member 61. A limiting nut 123 is threaded on a reduced stud 124 carried by the outer end of the bolt 116 so as to limit the outward adjustment of the hand wheel 120. In this manner the wheel 120 cannot be accidentally removed from the bolt 116 when it is turned in a tension released position.

A longitudinally curved spacer bar 125 is mounted between the two levers 65 and 112 and longitudinally curved friction bars 126 and 127 are interposed between the rear side of the bar 125 and the forward side of the lever 65 and between the forward side of the bar 125 and the rear side of the lever 112, respectively. A rear longitudinally curved spacer bar 128 is interposed between the rear frame member 58 and the rear side of the lever 65. A second longitudinally curved bar 129 which is formed at one end with an enlargement 130 is disposed on the forward side of the spacer 128 and a friction bar 131 is interposed between the bar 129 and the rear side of the lever 125. The friction bar 126 at one end thereof is also formed with an enlargement 132 having an elongated curved slot 133 through which one of the upper frame fastening bolts 93 loosely engages.

The two enlargements 130 and 132 extend upwardly of the top of the frame 56 as shown in Figure 4 and these enlargements are provided with aligned holes 133 and 134, for selectively receiving a frangible wire 135. The inner ends 136 and 137 of the enlargements 130 and 132 constitute stops for the lever 65. The lever 65 has slidingly mounted thereon a spring pressed latch member 138 provided with a handle 139 and the lower end of the latch member 138 is adapted to normally engage the stop members 136. A circular eccentric 140 is mounted on an upper frame bolt 93 between the spacer 126 and the friction bar 131.

In practice during the normal operation of the engine, the lever 65 will stop at the stop member 136, but if an emergency speed is desired the latch 138 may be raised so that the main lever 65 may be moved an additional distance depending on the position or adjustment of the eccentric stop 140. This latter emergency movement of the lever 65 will provide such an increase in the speed of the engine as to cause damage to the engine if operated for a predetermined period of time, and for this reason the telltale wire 135 is provided so that the mechanics looking over the control after the pilot returns to the ground can determine at a glance whether the emergency speed was used by the pilot.

Where such emergency high speed is used, the normal practise is to take the engine down and examine the same very carefully to determine what part or parts were damaged by such emergency speed. An elongated longitudinally curved spacer bar 141 is interposed between the forward frame member 57 and the lever 112 and a friction bar 142 of longitudinally curved configuration is interposed in the rear side of the bar 141 and the forward side of the lever 112.

A cover plate 143 is mounted on the front side of the frame 56 and is formed with an opening 144 in the lower portion thereof through which the hub or boss 121 of the hand wheel 120 loosely engages. The plate 143 is also formed with an elongated relatively large opening 145 which provides a means for giving access to the fastening members 80 on the secondary lever. Mixture lever 112 has secured thereto an angularly extending lever arm 146 disposed forwardly of the throttle lever arm 68 and the propeller pitch changing arm or lever 79.

In the use and operation of this control or quadrant, the lever arm 68 is connected by suitable linkage to the engine throttle and the lever arm 146 is connected to the mixture adjusting portion of the carburetor. The lever arm 79 is connected to the propeller pitch changing mechanism and the entire unit is mounted on the fuselage of the plane at a point convenient for the pilot. In Figure 4, the main throttle is shown in an intermediate position, wherein the propeller pitch mechanism is adjusted for a portion of the adjustment thereof, the adjusting pin 102 riding in the straight cam track portion being positioned substantially midway of the length of this cam track portion.

In the off position the lever 65 will be at the extreme left and in the full on or high speed lever 65 will be at the extreme right. Rocking of the lever 65 will cause the pin or roller 102 to move along the length of the cam track 88, and from the initial off position of the lever 65 to the beginning of the cam track portion 97, the cam 86 will remain stationary and the lever 75 will remain stationary. However, when the roller or pin 102 enters the beginning of the cam track portion 97, the cam 86 will be rocked downwardly at a speed greater than the rocking movement of the lever arm 68 which is fixed to the lever 65.

When the pin 102 passes out of the upper portion of the cam track portion 97 and enters the arcuate cam track portion 98, cam 86 will again remain stationary, holding the lever 75 stationary while lever 65 is rocked for the remainder of the rocking movement of this lever to the right. It will, of course, be understood that the configuration of the cam track 88 may be any desired configuration depending upon the desired movement which is to be effected with respect to the secondary lever 75.

The operation of the structure shown in Figures 1, 2 and 3 will be quite similar to that described as to the control mechanism shown in Figures 4 to 12, inclusive. It will be understood that if additional levers are to be connected with the main lever 65 for differential movement with respect thereto, it is only necessary to provide additional cams and other connections similar to that heretofore described.

With a quadrant or control as herein, it is unnecessary for the pilot of a combat plane to operate the individual controls for the different mechanisms manually and at the same time view the instrument board in order to determine the proper movement for adjustment of the several control levers with respect to the engine operation which is regulated by the main throttle. In other words, this control provides a synchronized mechanism operated from and by the main throttle lever which will relieve the pilot of any adjustment of the secondary lever or levers, and will relieve the pilot of the necessity during emergency combat operation to manually adjust the secondary levers in conjunction with the engine speed, as shown by the usual instruments on the instrument board.

This control is a very compact unit and has been placed in actual operation on combat planes and is found to serve a long-felt need for pilots in combat planes.

What I claim is:

1. A control device comprising a frame, a stationary pivot carried by said frame, a main lever rockable on said pivot, a secondary lever also rockable on said pivot, said secondary lever including a pair of angularly related arms, an elongated cam plate pivotally carried at one end thereof by said frame and provided with a cam track, a link pivotally connecting the opposite end of said cam plate to one arm of said secondary lever, and means carried by said main lever engaging in said cam track whereby rocking of said main lever will also rock said secondary lever in the same direction as the main lever in either direction of the movement of said main lever.

2. A control device as set forth in claim 1 in which the cam track is so formed as to provide for differential movement of said secondary lever with respect to said main lever.

3. A control device as set forth in claim 1 wherein the other of said arms is adjustable as to the length thereof.

4. A control device comprising a frame, a stationary pivot in said frame, a lever rockable on said pivot, a second two-arm lever rockable on said pivot, a cam plate pivoted at one end thereof in said frame, means pivotally securing one arm of said second lever to the other end of said cam plate, and means carried by said first lever engaging said cam whereby to rock the latter upon rocking of said first lever in the same direction as said first lever in either direction of the movement of said first lever.

5. A control device as set forth in claim 4 wherein said one arm of said second lever is formed with a reverted end and said cam plate pivotally engages in said reverted end.

6. A control device as set forth in claim 4 wherein the other arm of said second lever is adjustable as to length.

7. A control device as set forth in claim 4 wherein the other arm of said second lever is formed of two angularly disposed members, and means adjustably securing said members together whereby the distance of one of said members from the axis of said pivot may be varied.

8. A control device comprising a frame, a main lever pivotally carried by said frame, a secondary lever pivotally carried by said frame, a common pivot for said levers, and means pivotally carried by said frame and correlated with both of said levers providing lost motion of said secondary lever in at least one phase of movement of said secondary lever with respect to said main lever in one direction, for effecting the differential movement of said secondary lever with respect to said main lever in another phase of movement of said main lever in the same direction in either direction of movement of said main lever, said correlated means including a cam element pivotally supported at one end by said frame, a cam engaging member carried by said main lever, and a linkage connecting the other end of the cam element with said secondary lever.

9. A control device comprising a frame, a main lever pivotally carried by said frame, a secondary lever pivotally carried by said frame, a common pivot for said levers, and means pivotally carried by said frame and correlated with both of said levers providing lost motion of said secondary lever in at least one phase of movement of said main lever in one direction and for effecting differential movement of said secondary lever with respect to said main lever in another phase of movement of said main lever in the same direction, said correlated means including a plate formed with an elongated cam track, means pivotally securing one end of the said plate to said frame, a link connecting the opposite end of said plate to said secondary lever, and a roller carried by said main lever engaging said cam track.

10. A control device comprising a frame, a main lever pivotally carried by said frame, a second lever pivotally carried by said frame, a common pivot for said levers, a second lever operating plate pivotally carried by said frame with the fulcrum thereof offset from said common pivot, said plate having a cam track therein, a link connecting said plate with said second lever, and a part carried by said main lever engaging in said cam track, rocking of said main lever effecting differential rocking of said second lever in the same direction as and with said main lever in either direction of the movement of said main lever.

PHILIP M. WAITE.